US008860711B2

(12) United States Patent
Kim

(10) Patent No.: US 8,860,711 B2
(45) Date of Patent: Oct. 14, 2014

(54) TIMING CONTROLLER AND LIQUID CRYSTAL DISPLAY USING THE SAME

(75) Inventor: Hyoung Sik Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 13/309,110

(22) Filed: Dec. 1, 2011

(65) Prior Publication Data

US 2012/0139895 A1 Jun. 7, 2012

(30) Foreign Application Priority Data

Dec. 2, 2010 (KR) ........................ 10-2010-0122155

(51) Int. Cl.
*G06F 3/038* (2013.01)
*G09G 3/36* (2006.01)
*G09G 3/20* (2006.01)

(52) U.S. Cl.
CPC .......... *G09G 3/3611* (2013.01); *G09G 2370/08* (2013.01); *G09G 2310/08* (2013.01); *G09G 3/20* (2013.01)
USPC .............................................. 345/213; 345/99

(58) Field of Classification Search
CPC .......... G09G 2310/08; G09G 2370/08; G09G 3/3611; G09G 3/20
USPC ............. 345/87, 691, 211, 205, 99, 204, 213, 345/161
See application file for complete search history.

(56) References Cited

U.S. PATENT DOCUMENTS

| | | | | |
|---|---|---|---|---|
| 6,335,647 | B1 * | 1/2002 | Nagano | 327/161 |
| 8,081,151 | B2 * | 12/2011 | Kishimoto et al. | 345/99 |
| 8,289,256 | B2 * | 10/2012 | Jeong et al. | 345/94 |
| 2007/0152947 | A1 * | 7/2007 | Tanaka et al. | 345/100 |
| 2008/0204388 | A1 * | 8/2008 | Lee et al. | 345/87 |
| 2009/0284455 | A1 * | 11/2009 | Jung | 345/87 |
| 2010/0141636 | A1 * | 6/2010 | Marsanne et al. | 345/213 |
| 2010/0164934 | A1 * | 7/2010 | Kim | 345/211 |
| 2010/0231559 | A1 * | 9/2010 | Ooga | 345/205 |
| 2011/0096106 | A1 * | 4/2011 | Nomaguchi et al. | 345/691 |
| 2011/0316821 | A1 * | 12/2011 | Suzuki et al. | 345/204 |
| 2012/0235982 | A1 * | 9/2012 | Ong | 345/212 |

FOREIGN PATENT DOCUMENTS

JP 2007-212543 A 8/2007

* cited by examiner

*Primary Examiner* — Sumati Lefkowitz
*Assistant Examiner* — Peijie Shen
(74) *Attorney, Agent, or Firm* — Birch, Stewart, Kolasch & Birch, LLP

(57) ABSTRACT

A timing controller and a Liquid Crystal Display (LCD) using the same are discussed. The timing controller according to an embodiment includes a reception unit which receives a video signal and a timing signal from a system; a control signal generation unit which generates a gate control signal and a data control signal with the timing signal, and outputs the gate control signal and the data control signal to a gate driver and a data driver, respectively; an image signal generation unit which realigns the video signal to output a realigned image signal; and a delay compensation unit which performs delay compensation for the realigned image signal with a circuit recombined according to a delay compensation value between each data drive Integrated Chip (IC) of the data driver and the image signal generation unit, and outputs the delay-compensated image signal to each data drive IC.

5 Claims, 4 Drawing Sheets

(a) (b)

TIMING CONTROLLER AND LIQUID CRYSTAL DISPLAY USING THE SAME

CROSS REFERENCE TO RELATED APPLICATIONS

This application claims the benefit of the Korean Patent Application No. 10-2010-0122155 filed on Dec. 2, 2010, which is hereby incorporated by reference as if fully set forth herein.

BACKGROUND

1. Field of the Invention

The present invention relates to a timing controller and a Liquid Crystal Display (LCD) using the same, which compensate for the delay of a mini-Low Voltage Differential Signal (LVDS) output signal generated between the timing controller and a data drive Integrated Chip (IC).

2. Discussion of the Related Art

Recently, flat panel display devices that can decrease a weight and a volume corresponding to the limitations of Cathode Ray Tubes (CRTs) are being developed. Liquid Crystal Displays (LCDs), Plasma Display Panels (PDPs), Field Emission Displays (FEDs), and Organic Light Emitting Diodes (OLEDs) are actively being researched as flat panel display devices.

Among such display devices, LCDs have a small size, a thin thickness and low power consumption, and thus are being applied to notebook computers, office automation equipment and audio/video equipment. In addition, with the advance of a manufacture technology, LCDs are being applied even to large digital televisions (DTVs). Particularly, since an active matrix type of LCD that uses a Thin Film Transistor (TFT) as a switch device is suitable for displaying a dynamic image, the active matrix type of LCD are widely being used in various fields.

Such LCDs generally include an interface, a timing controller, a reference voltage generator, a data driver, a gate driver, a power source voltage generator, and a liquid crystal display panel.

Herein, the interface receives data (for example, RGB data) and timing signals (for example, an input clock, a horizontal sync signal, a vertical sync signal, and a data enable signal) that are inputted from a driving system such as a personal computer or a DTV System on Chip (SoC), and supplies the received data and signals to the timing controller. In this case, a Low Voltage Differential Signal (LVDS) interface and a Transistor Transistor Logic (TTL) interface are mainly being used for transferring the data and timing signals from the driving system. The interface and the timing controller are integrated in a single chip and used.

Moreover, the timing controller generates control signals for driving the data driver including a plurality of data drive integrated circuits (ICs) and the gate driver including a plurality of gate drive ICs, by using the timing signals that are inputted through the interface. Also, the timing controller transfers the data, which are inputted through the interface, to the data driver.

In devices such as notebook computers that are configured with an LCD device having the above-described basic structure, a signal (i.e., an LVDS signal) inputted from the interface is transferred to the timing controller and is transferred to the data driver through the internal circuit of the timing controller.

FIG. 1 is a block diagram schematically illustrating a related art LCD, and is an exemplary diagram for describing a method where the related art LCD compensates for the delay of a mini-LVDS output signal.

The related art LCD, as illustrated in FIG. 1, controls a mini-LVDS output current according to an RMLVDS resistance value.

That is, in the related art LCD, a timing controller 11 changes a resistance value with an external control (RMLVDS) pin to control the mini-LVDS output current, thereby controlling the output levels of total mini-LVDS output signals.

Therefore, the related art LCD may control the level of the mini-LVDS output signal with a fixed termination resistance value and an output current.

However, although the mini-LVDS outputs of the timing controller 11 are outputted identically, since the mini-LVDS outputs pass through various cables 12 and a source Printed Circuit Board (PCB) 13 that exist between the timing controller 11 and the data drive IC 15, delay occurs.

Therefore, different delays occur in the input terminals of each of the data drive ICs 15, and thus the mini-LVDS outputs may not be synchronized with a reference clock. Due to this, the output of a specific data drive IC may be abnormal.

However, the related art LCD cannot control the delay of the mini-LVDS output signal that is outputted from the timing controller to the each data drive IC.

To provide additional description, while the mini-LVDS signals outputted from the timing controller 11 are passing though the cables 12 and the source PCB 13, the mini-LVDS signals are required to have the same delay in order for the data drive ICs 15 to be synchronized with each other. For this, a cable resistance component is required to be constant, and all transfer paths in the source PCB 15 are required to match with each other. However, delay occurs substantially because it is difficult to maintain the same transfer path length on a PCB having a limited area, and moreover, it is difficult to maintain the same parasitic component between all transfer lines in the cables 12. To simply solve the above-described delay, it is required to perform delay compensation for a specific path having an error. However, the related art LCD cannot control delay. Furthermore, since improvement is required through the re-design of the source PCB 15 or the like for solving the delay of a specific path, additional development time and cost for improvement are expended.

SUMMARY

Accordingly, the present invention is directed to a timing controller and an LCD using the same, which receive a delay compensation value that is calculated through measurement in a manufacture stage of a liquid crystal display panel, and compensate for delay between the timing controller and a data drive IC.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a timing controller comprising: a reception unit which receives a video signal and a timing signal from a system; a control signal generation unit which generates a gate control signal and a data control signal with the timing signal, and outputs the gate control signal and the data control signal to a gate driver and a data driver, respectively; an image signal generation unit which realigns the video signal to output a realigned image signal; and a delay compensation unit which performs delay compensation for the realigned image signal with a circuit which is recombined according to a delay compensation value between each data drive Integrated Chip (IC) of the data driver and the image signal generation unit, and outputs the delay-compensated image signal to the each data drive IC.

In another aspect of the present invention, there is provided an LCD comprising: the timing controller; a liquid crystal display panel which displays an image; a gate driver which comprises a plurality of gate drive Integrated Chips (ICs), and controls a gate line of the liquid crystal display panel according to a gate control signal transferred from the timing controller; and a data driver which comprises a plurality of data drive ICs, and controls a data line of the liquid crystal display panel according to a data control signal and an image signal which are transferred from the timing controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described with reference to the accompanying drawings.

Figure 1:
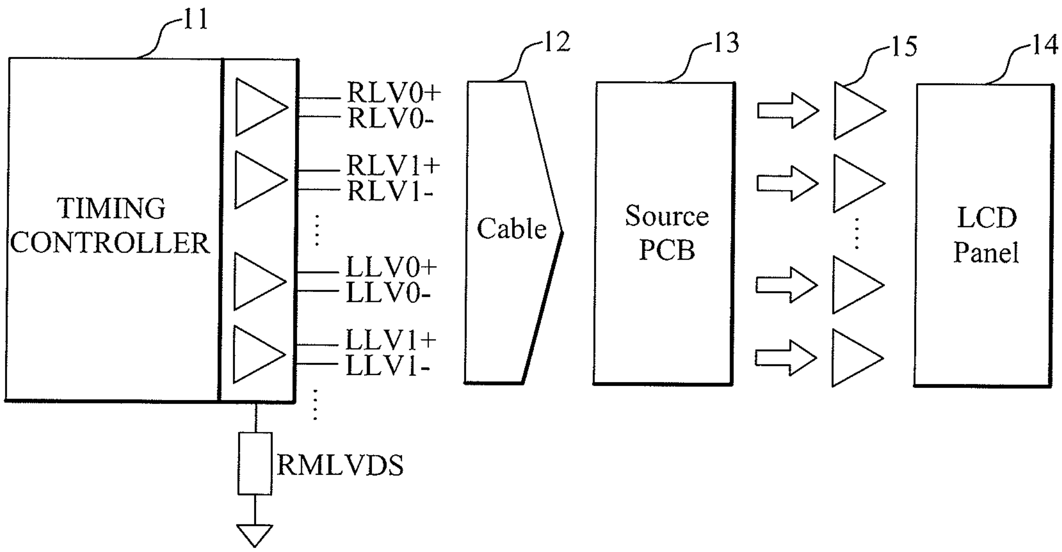
FIG. 1 is a block diagram schematically illustrating a related art LCD.
Figure 2:
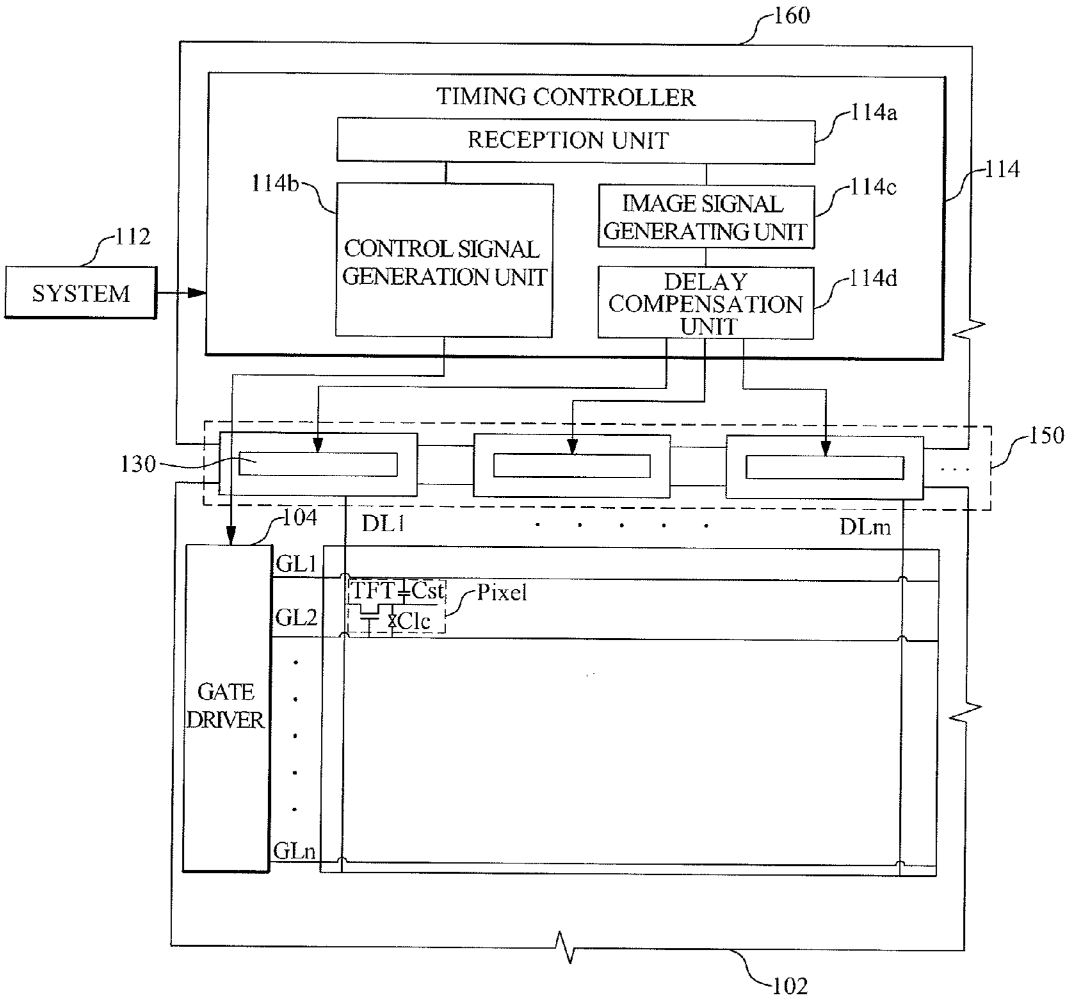
FIG. 2 is a block diagram illustrating an LCD according to an embodiment of the present invention.

FIG. 2 is a block diagram illustrating an LCD according to an embodiment of the present invention.

An LCD using a timing controller according to the present invention, as illustrated in FIG. 2, includes a liquid crystal display panel 102, a driving circuit, and a backlight unit (not shown). Herein, the driving circuit includes a timing controller 114, a gate driver 104 including a plurality of gate driver ICs (not shown), and a data driver 150 including a plurality of data driver ICs 130.

Herein, the timing controller 114 is mounted on a control board 160. The data drive ICs 130 for driving a data line DL of the liquid crystal display panel 102 is connected to the control board 160 that is mounted on a data circuit film. The gate driver 104 is provided on the liquid crystal display panel 102, but the data drive ICs 130 for driving the data drive 150 and the gate driver 104 may be provided in various types.

The liquid crystal display panel 102 includes a lower substrate (not shown) and an upper substrate (not shown) that are coupled with a liquid crystal layer (not shown) therebetween. In the liquid crystal display panel, a plurality of pixel cells (which include a plurality of liquid crystal cells Clc, respectively) are arranged in a matrix type. The liquid crystal display panel 102 controls transmittance of light that is transmitted through the liquid crystal layers of a plurality of pixel cells according to a data voltage, thereby displaying an image based on the video signal.

The upper substrate includes a black matrix that defines a pixel region so as to be in correspondence with each of a plurality of pixel cells, a red color filter that is formed in a pixel cell defined by the black matrix, a green color filter that is formed in a pixel cell defined by the black matrix, a blue color filter that is formed in a pixel cell defined by the black matrix, and an overcoat layer that is formed to cover the black matrix and the color filters and planarizes the upper substrate.

The lower substrate includes a plurality of pixel cells that are formed in respective regions that are defined by intersection between an n number of gate lines GL and an m number of data lines DL. Each of the pixel cells includes a thin film transistor TFT and a storage capacitor Cst that are formed at an intersection portion between a gate line and a data line. The thin film transistor TFT supplies a data voltage, which is applied through the data line, to the liquid crystal cell Clc in response to a scan signal that is applied through the gate line.

The each pixel cell is defined by the data line and the gate line that are intersected. The thin film transistor TFT is switched with the scan signal (i.e., a gate signal) that is applied through the gate line, and thus the each pixel cell is turned on. In the turned-on each pixel cell, an electric field is formed with a data voltage that is applied through the data line, and drives the liquid crystal display layer.

For this, a pixel electrode (not shown, pixel ITO) that supplies a data voltage based on the video signal to a pixel cell is formed in the each pixel cell, and the common electrode (not shown) receiving the common voltage Vcom is formed in the each pixel cell. Herein, the common electrode and the pixel electrode may be formed of a transparent conductive material such as ITO, and the common electrode may be formed over/under the pixel electrode.

The driving circuit includes the timing controller 114, the data driver 150, a common voltage generator (not shown), a gate driver 104, and a power supply (not shown). Herein, the timing controller 114 aligns an external video signal transferred from an external system 112 by frame unit to generate digital image data RGB, and generates a driving control signal DCS of the data drive IC and a driving control signal GCS of the gate drive IC. The data driver 120 includes the data drive ICs 130 that supply data voltages based on the video signal to the liquid crystal display panel. The common voltage generator supplies a common voltage Vcom to a common electrode of the liquid crystal display panel. The gate driver 104 includes the gate drive ICs that sequentially supply a scan signal to the liquid crystal display panel. The power supply supplies a driving power.

The external system 112 receives data RGB and timing signals (for example, a horizontal sync signal, a vertical sync signal, and a data enable signal) that are generated in a device such as a personal computer, and provides the received data and signals to the timing controller 114. In this case, an LVDS interface is mainly being used for transferring the data and timing signals from the driving system to the timing controller 114.

The timing controller 114 is connected to and communicates with the external system 112. On the other hand, in the related art, data transfer between the timing controller 114 and the system 112 is performed at a TTL level. However, since a method of transferring data at the TTL level requires a lot of transfer lines, the number of cables or connectors increases, and moreover, a probability that a transfer line may be exposed to an external noise source becomes higher. Due to this, recently, a Low Voltage Differential Signaling (LVDS) technology is widely being used as an interface between the system 112 and the timing controller 114.

The LVDS technology generates two signals with opposite polarities, and transfers data on the basis of the two signals. Therefore, the LVDS technology may transfer data at a low voltage, and thus has a low consumption power and a high transfer speed. Also, the LVDS technology has an excellent resistance to noise.

Moreover, the timing controller 114 generates control signals for driving the data driver 150 including the data drive ICs 130 and the gate driver 104 including the gate drive ICs, with the timing signals inputted through the system 112. Also, the timing controller 114 realigns data that are received through the system 112 in an LVDS scheme, and transfers the realigned data to the data drive ICs 130.

The timing controller 114 realigns a video signal supplied from the system 112 and transfers the realigned signal to the data drive ICs 130 of the data driver 150. The timing controller 114 generates a gate control signal GCS and a data control signal DCS with a clock signal CLK, a horizontal sync signal Hsync, a vertical sync signal Vsync and a data enable signal DE that are supplied from the system 112, and transfers the generated signals GCS and DCS to the gate driver 104 and the data driver 150, respectively.

Moreover, the timing controller 114 compensates for signal delay between the timing controller 114 and the data drive ICs 130, thereby allowing the data drive ICs 130 to be driven in a state where the timing controller 114 is synchronized with the data drive ICs 130. For this, as illustrated in FIG. 2, the timing controller 114 includes a reception unit 114*a*, a control signal generation unit 114*b*, an image signal generation unit 114*c*, and a delay compensation unit 114*d*.

The reception unit 114*a* receives the timing signals (for example, the clock signal CLK, the horizontal sync signal Hsync, the vertical sync signal Vsync, and the data enable signal DE) and a video signal from the system 112.

The control signal generation unit 114*b* generates the gate control signal GCS and the data control signal DCS with the timing signals received through the reception unit 114*a*, and transfers the gate control signal GCS and the data control signal DCS to the gate driver 104 and the data driver 150, respectively.

The image signal generation unit 114*c* realigns the image signal received through the reception unit 114*a*, and outputs the realigned signal to the data drive ICs 130 of the data driver 150.

The delay compensation unit 114*d* compensates for delay that occurs between the timing controller 114 and the data drive ICs 130 of the data driver 150, and thus allows the data drive ICs 130 to output the image signal received from the timing controller 114 in synchronization with the timing controller 114.

To normally output the image signal transferred from the timing controller 114, the data drive ICs 130 are required to be synchronized with each other, for which the data drive ICs 130 are identically delayed while a mini-LVDS signal outputted from the timing controller 114 are passing though a cable and a source PCB. For this, the cable resistance components of the control board 160 and data drive ICs 130 are required to be constant, and all transfer paths in the control board 160 are required to match with each other. Also, FIG. 2 illustrates that the data drive ICs 130 are mounted on a Tape Carrier Package (TCP), but the data drive ICs 130 may be implemented on a separate source PCB or control board, in which case all resistance components are required to match with each other on a transfer path between the timing controller 114 and each of the data drive ICs 130.

However, delay occurs substantially because it is difficult to maintain the same transfer path length on a PCB (for example, the control board 160 or the source PCB) having a limited area, and moreover, it is difficult to maintain the same parasitic component between all transfer lines in the cable.

Therefore, the present invention includes the delay compensation unit 114*d* in the timing controller 114, for compensating different delay characteristics between the timing controller 114 and the data drive ICs 130.

The present invention compensates for the delay of a mini-LVDS occurring while the mini-LVDS is outputted from the timing controller 114 and passes through various cables and source PCBs that are included between the timing controller 114 and the data drive ICs 130. For this, the timing controller 114 includes the delay compensation unit 114*d* including a delay compensator that is connected to each mini-LVDS output terminal.

To provide additional description, in an ideal case, mini-LVDSs that are simultaneously converted and outputted by the timing controller 114 are simultaneously inputted to the data drive ICs 130, respectively, and are synchronized with the reference clock. However, as illustrated FIG. 2, since the data drive ICs 130 are mounted on a base film in a Chip On Film (COF) type or directly mounted on the liquid crystal display panel 102 in a Chip On Glass (COG) type, various cables, lines, films and PCBs are included between the timing controller 114 and the data drive ICs 130. Due to this, the mini-LVDSs that are respectively outputted from the timing controller 114 and inputted to the data drive ICs 130 have different delay values.

Therefore, the present invention uses a method that measures the delay values of mini-LVDS output signals that are respectively outputted from the timing controller 114 and inputted to the data drive ICs 130 with a measurement apparatus in the manufacture stage of the LCD, generates a delay compensation value with the measured delay values, and recombines a circuit of the delay compensation unit 114*d* of the timing controller 114 according to the generated delay compensation value.

In response to the data control signals inputted from the timing controller 114, each of the data drive ICs 130 selects a reference voltage of a delay-compensated input image signal and supplies the selected reference voltage to the liquid crystal display panel 102 to control the twisted angles of liquid crystal molecules.

In response to the gate control signals inputted from the timing controller 114, the gate driver 104 controls the turn-on/off of a plurality of thin film transistors TFT that are arranged in the liquid crystal display panel 102, and thus allows analog image signals supplied from the data driver 150 to be applied to pixels connected to the transistor thin films TFT, respectively.

Moreover, a power source voltage generator (not shown) supplies an operation power of each element, and generates and supplies a common electrode voltage of the liquid crystal display panel 102. The backlight unit (not shown) supplies desired light to the liquid crystal display panel 102.

Figure 3:
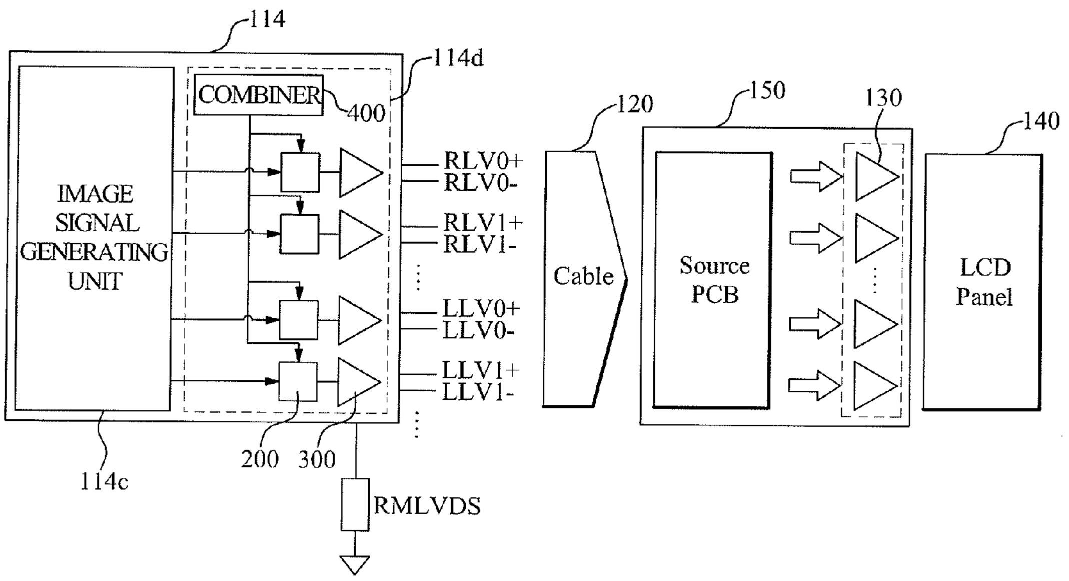
FIG. 3 is an exemplary diagram illustrating a delay compensation unit of a timing controller according to an embodiment of the present invention.
Figure 4:
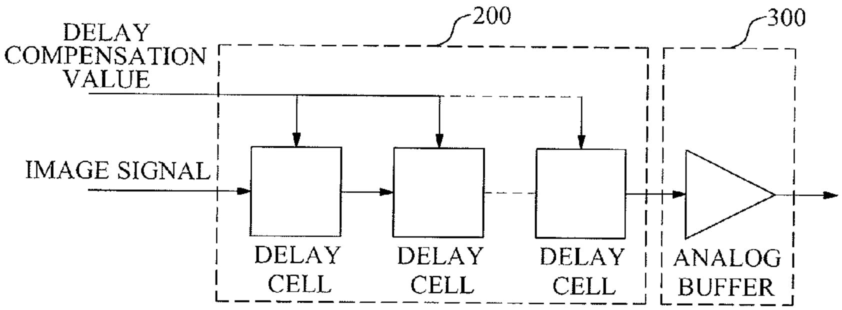
FIG. 4 is an exemplary diagram illustrating a detailed configuration of a delayer in FIG. 3.
Figure 5:
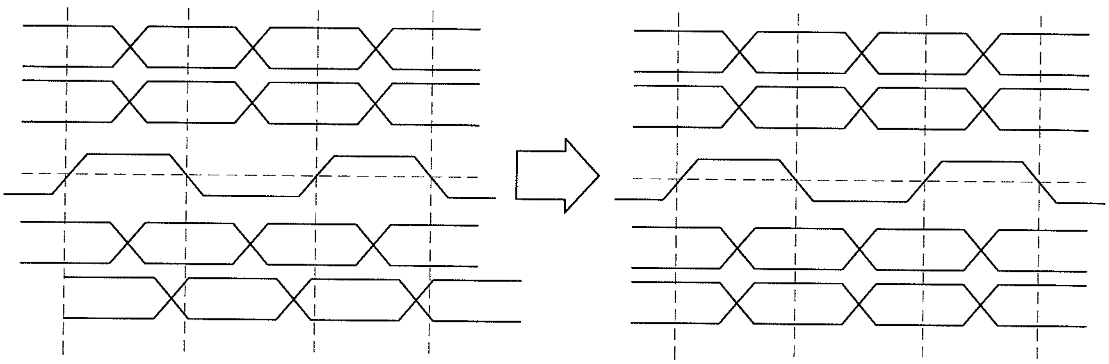
FIG. 5 is an exemplary diagram showing a waveform inputted to a data drive IC in an LCD according to an embodiment of the present invention.

FIG. 3 is an exemplary diagram illustrating a delay compensation unit of a timing controller according to an embodiment of the present invention. FIG. 4 is an exemplary diagram illustrating a detailed configuration of a delayer 200 in FIG. 3. Particularly, FIG. 4 illustrates a configuration of one delayer 200 connected to one data drive IC. FIG. 5 is an exemplary diagram showing a waveform inputted to a data drive IC in an LCD according to an embodiment of the present invention.

The timing controller 114 generates a main clock signal mCLK, a plurality of data control signals for driving the data driver 150 including the data drive ICs 130, and a plurality of gate control signals for driving the gate driver 104 including the gate drive ICs, with a plurality of timing signals inputted from the external system 112 such as a graphic card. The timing controller 114 includes the delay compensation unit **114*d* that compensates for different delay characteristics between the timing controller 114 and the data drive ICs 130**.

The delay compensation unit **114*d*, as illustrated in FIG. 3, includes a plurality of delayers 200 respectively connected to the data drive ICs 130, a buffer 300 that is connected to respective output terminals of the delayers 200 and outputs a delay-compensated image signal, and a combiner 400 that stores information for logically recombining delay compensation circuits of the respective delayers 200**.

The combiner 400 measures the delay values of the mini-LVDSs that are respectively outputted from the timing controller 114 and inputted to the data drive ICs 130 with the measurement apparatus in the manufacture stage of the LCD according to an embodiment of the present invention, stores a delay compensation value that is generated with the measured delay values, and allows a circuit structure of the each delayer 200 to be recombined with the delay compensation value. For this, the combiner 400 may be configured with Electrically Erasable Programmable Read-Only Memory (EEPROM) or logic combination.

The circuit of the delayer 200 is recombined with the delay compensation value that is set by the combiner 400, and thus outputs an image signal to each of the data drive ICs 130 according to a compensated delay value. For this, as illustrated in FIG. 4, the delayer 200 may be configured with a plurality of delay cells.

That is, the delayer 200 that are configured with the delay cells changes the combination of each of the delay cells according to a logic signal transferred from the combiner 400, and thus may implement the delay compensation value set by the combiner 400 in circuit.

In the present invention, as illustrated in FIG. 3, since the delayer 200 is configured in a one-to-one correspondence relationship with each of the data drive ICs 130, a circuit structure based on the delay compensation value for compensating for delay between the timing controller 114 and each of the data drive ICs 130 may be configured for each data drive IC.

The delayer 200 individually controls an input signal of each mini-LVDS output terminal by using the EEPROM or logic combination of the combiner 400, and thus can compensate for the signal delay of a specific path where an error occurs due to the parasitic resistance and capacitor component of a cable or source PCB.

The buffer 300 outputs image signals outputted from the delayers 200 to the data drive ICs 130, respectively.

According to the above-described embodiment of the present invention, since an image signal outputted from the timing controller 114 to each of the data drive ICs 130 is an image signal that has been compensated for delay occurring due to each element between the timing controller 114 and each of the data drive ICs 130, as shown in a portion (b) of FIG. 5, image signals transferred from the timing controller 114 to the data drive ICs 130 may be inputted the respective data drive ICs 130 in a synchronized state. A portion (a) of FIG. 5 is an exemplary diagram showing the timing of an image signal inputted to each data drive IC in the related art LCD, and it can be seen that the image signals inputted to the respective data drive ICs are not synchronized with each other. On the other hand, the portion (b) of FIG. 5 is an exemplary diagram showing the timing of an image signal inputted to each data drive IC 130 in the LCD according to an embodiment of the present invention, and it can be seen that the image signals inputted to the respective data drive ICs 130 are synchronized with each other.

In the present invention, a method that compensates for the delay of a mini-LVDS output signal will be described below in detail.

First, in a manufacture stage of the LCD, a manufacturer measures delay from the timing controller 114 to the data drive ICs 130, with the measurement apparatus. Herein, as described above, FIG. 2 illustrates that the each data drive IC 130 is configured in a TCP type, but the each data drive IC 130 may be directly provided to the source PCB (not shown), the control board 160 or the liquid crystal display panel 102.

Next, the manufacturer calculates a delay compensation value with the measured delay compensation value between the timing controller 114 and the each data drive IC 130, and inputs information of the calculated delay compensation value to the combiner 400. At this point, the delay compensation value may be generated for each data drive IC and stored in the combiner 400. Also, the combiner 400 may be provided in plurality for each data drive IC 130 (or each delay 200), in the delay compensation unit **114*d*. However, as illustrated in FIG. 2, the combiner 400** may be provided only as one and receive delay compensation values for a plurality of delayers in integration.

Subsequently, when the LCD is driven, the delayer 200 reconfigures a circuit according to the delay compensation value set by the combiner 400 and outputs a delay-compensated image signal to the each data drive IC 130. In this case, since the combiner 400 does not store information of a delay compensation value for each data drive IC, circuit recombination for separate compensation of delay is not performed in a delayer connected to a data drive IC that does not store the information of the delay compensation value, but circuit recombination for separate compensation of delay is performed only in a delayer connected to a data drive IC that stores the information of the delay compensation value.

The present invention individually controls the delay of the mini-LVDS output signal for each data drive IC, and thus compensates for delay that occurs in a cable and PCB (a control board or a source PCB) between the timing controller 114 and the each data drive IC 130, thereby enhancing the quality and reliability of the LCD.

The present invention individually controls the delay of the mini-LVDS signal applied from the timing controller 114 to the each data drive IC 130, and thus compensates for a delay factor based on cable characteristic and PCB design, thereby enhancing the quality of the LCD and shortening the development schedule of the LCD.

As described above, the present invention receives the delay compensation value that is calculated through measurement in the manufacture stage of the liquid crystal display panel, and compensate for delay between the timing controller and the data drive IC, thereby enhancing the quality and reliability of the LCD device. Also, the present invention can save the development cost that is expended in development of a new cable and revision of a PCB, and shorten a development schedule.

Moreover, the present invention individually controls a specific path causing an error, thereby saving additional development cost expended in revision of the PCB.

Furthermore, the present invention controls only a specific output terminal of the timing controller, and thus can prevent additional limitations such as the increase in a consumption power and the deterioration of EMI characteristic.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A timing controller comprising:

a reception unit which receives a video signal and a timing signal from a system;

a control signal generation unit which generates a gate control signal and a data control signal with the timing signal, and outputs the gate control signal and the data control signal to a gate driver and a data driver, respectively;

an image signal generation unit which realigns the video signal to output a realigned image signal; and a delay compensation unit which performs delay compensation for the realigned image signal with a circuit which is recombined according to a delay compensation value between each data drive Integrated Chip (IC) of the data driver and the image signal generation unit, and outputs the delay-compensated image signal to the each data drive IC, wherein the delay compensation unit includes:

a plurality of delayers which are connected to the data drive ICs, respectively, and perform the delay compensation;

a buffer which is connected to output terminals of the delayers, and transfers the delay-compensated image signal to the each data drive IC; and a combiner which stores the delay compensation value for recombining a delay compensation circuit of each of the delayers, the delay compensation value being stored for each delayer, and which is configured in plurality to be individually connected to the delayers which are respectively connected to the data drive ICs, or configured as one to store the delay compensation value for all the delayers, and wherein each of the delayers includes a plurality of delay cells and adjusts output timing of the realigned image signal to the data drive IC by processing the realigned image signal through one or more of the plurality of delay cells according to the delay compensation value transferred from the combiner.

2. The timing controller according to claim 1, wherein:

the data drive IC is provided to a control board which comprises the timing controller, the data drive IC is provided to a separate source Printed Circuit Board (PCB), the data drive IC is provided on a film in a Tape Carrier Package (TCP) type, or the data drive IC is provided to a liquid crystal display panel.

3. The timing controller according to claim 1, wherein the delay compensation value is generated with a delay value which is measured by a measurement apparatus in a stage where the gate driver and the data driver are set in a liquid crystal display panel, and stored in the delay compensation unit.

4. The timing controller according to claim 1, wherein the combiner is configured with Electrically Erasable Programmable Read-Only Memory (EEPROM) or logic combination.

5. A Liquid Crystal Display (LCD) using a timing controller, the LCD comprising:

a timing controller comprising a reception unit which receives a video signal and a timing signal from a system, a control signal generation unit which generates a gate control signal and a data control signal with the timing signal, and outputs the gate control signal and the data control signal to a gate driver and a data driver, respectively, an image signal generation unit which realigns the video signal to output a realigned image signal, and a delay compensation unit which performs delay compensation for the realigned image signal with a circuit which is recombined according to a delay compensation value between each data drive Integrated Chip (IC) of the data driver and the image signal generation unit, and outputs the delay-compensated image signal to the each data drive IC; and a liquid crystal display panel displaying an image, wherein, the gate driver comprises a plurality of gate drive Integrated Chips (ICs), and controls a gate line of the liquid crystal display panel according to a gate control signal transferred from the timing controller, the data driver comprises a plurality of data drive ICs, and controls a data line of the liquid crystal display panel according to a data control signal and an image signal which are transferred from the timing controller, and the delay compensation unit includes:

a plurality of delayers which are connected to the data drive ICs, respectively, and perform the delay compensation;

a buffer which is connected to output terminals of the delayers, and transfers the delay-compensated image signal to the each data drive IC; and a combiner which stores the delay compensation value for recombining a delay compensation circuit of each of the delayers, the delay compensation value being stored for each delayer, and which is configured in plurality to be individually connected to the delayers which are respectively connected to the data drive ICs, or configured as one to store the delay compensation value for all the delayers, and wherein each of the delayers comprises a plurality of delay cells and adjusts output timing of the realigned image signal to the data drive IC by processing the realigned image signal through one or more of the plurality of delay cells according to the delay compensation value transferred from the combiner.

* * * * *